United States Patent [19]

Clasen

[11] Patent Number: 4,684,386
[45] Date of Patent: Aug. 4, 1987

[54] METHOD FOR THE MANUFACTURE OF GLASS BODIES

[75] Inventor: Rolf Clasen, Aachen, Fed. Rep. of Germany

[73] Assignee: U.S. Philips Corporation, New York, N.Y.

[21] Appl. No.: 836,919

[22] Filed: Mar. 6, 1986

[30] Foreign Application Priority Data

Mar. 29, 1985 [DE] Fed. Rep. of Germany ....... 3511451

[51] Int. Cl.$^4$ ........................................... C03B 37/016
[52] U.S. Cl. ............................................ 65/18.1; 65/2; 65/3.11; 65/3.12; 65/18.4; 65/DIG. 900; 65/DIG. 901; 65/17; 156/DIG. 108; 264/27; 501/12
[58] Field of Search .................. 65/2, 3.11, 3.12, 17, 65/18.1, 18.3, 18.4, DIG. 16, DIG. 900, DIG. 901; 501/12; 156/DIG. 108; 264/27

[56] References Cited

U.S. PATENT DOCUMENTS 4,220,461  9/1980  Samanta ................................. 65/17
4,417,910  11/1983  Passaret ....................... 65/DIG. 16
4,419,115  12/1983  Johnson et al. .................. 65/18.3 X

FOREIGN PATENT DOCUMENTS 2334639  7/1977  France ............................... 65/3.11

*Primary Examiner*—Robert L. Lindsay
*Attorney, Agent, or Firm*—Norman N. Spain

[57] ABSTRACT

Method and equipment for the manufacture of glass bodies with which a porous green body is formed from the starting material for the glass body in the form of an aqueous suspension with highly disperse solids content and this green body is then purified and sintered, the green body being deposited by separation of the phases of the suspension by electrophoresis.

23 Claims, 2 Drawing Figures

METHOD FOR THE MANUFACTURE OF GLASS BODIES

BACKGROUND OF THE INVENTION

The invention relates to a method for the manufacture of glass bodies wherein a porous green body is formed from the starting material for the glass body in the form of an aqueous suspension with highly disperse solids content and this green body is then purified and sintered.

The invention also relates to equipment for implementing such a method and to the application of the glass bodies produced by the invention method.

The method referred to in the preamble is particularly suitable for the manufacture of preforms for optical waveguides of fused silica.

Methods are known for the manufacture of extremely pure fused silica bodies, particularly preforms for optical waveguides, in which a porous green body is produced from highly disperse $SiO_2$ particles, after which the said porous green body is first of all purified in, for example, a chlorine-containing atmosphere at temperatures in the range from 600° to 900° C. Sintering to form a compact, transparent glass is then carried out at temperatures in the range around 1500° C.; the height of the sintering temperature depends on the size of the $SiO_2$ particles and the homogeneity of the green body. The processing of highly disperse fused silica powders requires a considerable amount of equipment (blank moulds for the manufacture of a manageable green body and presses for the compaction of this green body), if a green body is to be obtained which has a sufficiently high density for efficient sintering, i.e. for sintering at temperatures 1550° C. into a glass body free from bubbles and ream. Such a method for the manufacture of a preform for optical waveguides is known, for example, from German Patent DE No. 3240355.

Methods of producing green bodies of sufficient density are also known which start out from highly disperse $SiO_2$ suspensions which are formed into a green body. German Patent Application DE No. 2925309 describes a method in which an $SiO_2$ suspension is sprayed into or onto a carrier tube. The drawbacks of this method are that high requirements have to be made of a uniformly operating spraying device and purification of the green body obtained is not possible in a hot gas atmosphere which binds contaminants because the carrier tube is not porous.

BRIEF SUMMARY OF THE INVENTION

An object of the invention is to create a method and equipment for the manufacture of extremely pure glass bodies, with which a green body is obtained which is sufficiently porous to be able to be satisfactorily purified in an intermediate heating stage in a gas atmosphere reacting with any contaminants present, but which has such high density that the subsequent sintering stage can take place without additional measures for compacting the purified green body.

The invention method achieves this object in the following way: the green body is deposited on a porous membrane by seperation of the phases of the suspension by electrophoresis in an electrophoresis cell. The electrophoresis cell employed for the implementation of this method is characterized by a vessel in the centre of which is arranged a porous membrane corresponding to the shape of the green body to be produced, in the centre of which is arranged a cathode, the interior space of the membrane being designed to hold starting material for phase separation in the form of a suspension and the space between the membrane and an anode arranged at a distance from the membrane being filled with an electrically conducting liquid, the anode and the cathode being electrically connected by means of electrode terminals.

DETAILED DESCRIPTION OF THE INVENTION

Figure 1:
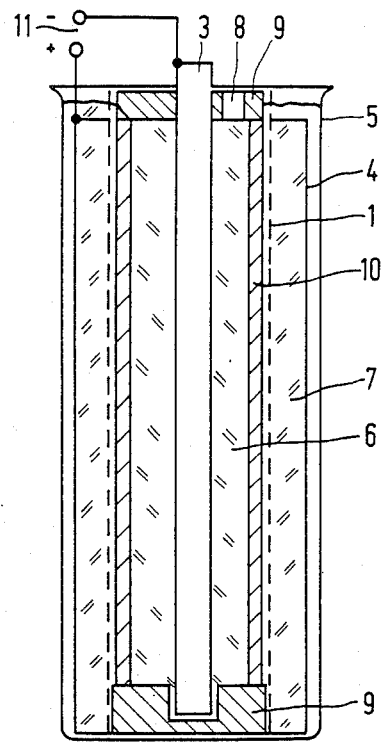
FIG. 1 is a cross-section view of one embodiment of a cell used in carrying out the method of the invention.

The electophoretic deposition of the solid particles from an aqueous suspension as the starting material for a glass body encounters the problem that not only are negatively charged particles, particularly the fused silica particles, deposited at the anode, but at voltage 1 V oxygen is simultaneously released during the deposition and is also deposited at the anode and is thus incorporated in the growing solid layer, resulting in pores inside the green body thus formed which can only be dense-sintered at increased expense (i.e. temperatures above 1550° C.). This problem can be avoided if, for example, a non-aqueous suspension is used. However, for industrial manufacture of highly pure bubble- and ream-free fused silica bodies there are substantial advantages if aqueous solutions can be used. For the purpose of preventing the incorporation of oxygen in the growing solid layer, one advantageous development of the invention envisages the following: the solids content of the suspension is deposited on a porous membrane with pores of a diameter smaller than the mean particle diameter of the solid particles present in the suspension, in which case the membrane is arranged between the cathode and the anode and the space between the membrane and the anode is filled with an electrically conducting liquid.

According to further advantageous embodiments of the method according to the invention the starting material for the glass body is an aqueous suspension which contains $SiO_2$ particles having a diameter in the range of 10 to 500 nm, preferably of 15 to 100 nm, with a mean particle diameter of 40 nm, with a solids:water weight ratio of 1:1 to 1:4. This has the advantage that green bodies can be obtained with an advantageously high density which amounts to 35 to 60%, preferably 50% of the density of compact fused silica.

According to a further advantageous embodiment of the method according to the invention, use is made of a porous membrane which has pores with a diameter of 10 nm and 0.14 nm. The pore diameter of the membrane is selected in such a way that the highly disperse solid particles with a mean particle diameter of 40 nm are retained on the membrane, whereas smaller ions, such as, for example, OH-ions with a diameter of 0.14 nm can pass through the membrane.

It can be advantageous to use as the membrane a porous hose of synthetic material such as is used, for example, in dialysis methods.

According to an advantageous embodiment of the method according to the invention, an ionogenic substance which shifts the pH-value of the suspension towards the basic region (pH 10) is added to the suspension. This has several benefits: first of all, the ionogenic additive brings about dispersion of the solid particles (particularly in an ultrasonic field) and promotes the homogeneous cross-linking of the solid particles in the suspension both in respect of the speed of cross-linking and the increase in the linkage force between the solid particles.

This makes it possible to obtain more homogeneous, stabilized suspensions which, in turn, have the advantage that a homogeneous pore volume is present in the green body formed from the suspension so that lower sintering temperatures are sufficient to obtain a bubble- and ream-free glass body than if a green body with a very inhomogeneous pore body had to be sintered to form a glass body of comparable quality. This means that cheaper sintering furnaces can be used; at sintering temperatures up to 1550° C., furnaces with an SiC lining can be used, while at sintering temperatures above 1550° C. furnaces with a high-refractory lining of, for example, $MoSi_2$ have to be used; these furnaces are more expensive than SiC-lined furnaces. A further advantage of the minimum possible sintering temperature is the fact that with increasing sintering temperature recrystallization effects at the surface of the sintered body increase which are particularly disturbing and undesirable when the glass bodies are to be used as preforms for optical waveguides since the mechanical properties deteriorate considerably (danger of cracking).

If, as in one further advantageous embodiment of the method according to the invention, an ammonium compound is used as the ionogenic additive, this has the benefit that the additive is readily volatile and can be removed without trace from the green body in a subsequent purification-heating step so that fused silica bodies of a very high purity can be produced. Thanks to the addition of an ammonium compound, green bodies of relatively high strength are obtained because a gel formation occurs at the points of contact of two primary $SiO_2$ particles. $SiO_2$ is deposited at the points of contact and forms a bridge layer.

If, as in one advantageous further embodiment of the method according to the invention, a 5% aqueous $NH_4F$ solution is added as the ionogenic substance to the suspension, fluorine doping can be achieved which is suitable, for example, for the manufacture of cladding glasses for optical waveguides.

According to another advantageous embodiment of the method according to the invention, the ionogenic substance is added in a quantity of 0.05 to 5 wt.% of the solids content in the suspension. This has the advantage that the additive acting as a cross-linking activator is present in such a quantity that the surface of the solids particles in the suspension is completely covered with ions of the ionogenic substance. The quantity of the ionogenic additive should not be greater than 5 wt.% of the solids content of the suspension because otherwise the viscosity of the suspension undergoes a sharp increase, and this has an adverse effect on the electrophoretic deposition.

According to another advantageous embodiment of the method according to the invention, a laminated body is produced from differently doped suspensions by deposition of several layers in succession. For this purpose, the first suspension is removed from the equipment after a desired layer thickness of the green body has been achieved and the deposition process is continued with a second suspension which, for example, is differently doped from the first suspension. The present method therefore is particularly suitable for manufacturing preforms for optical waveguides which have a graded refractive index profile.

It is also possible to manufacture an optical waveguide with W-profile by incorporation of an intermediate layer with lower refractive index which is obtained by using a suspension with appropriate doping. Dopes for changing the refractive index of a glass body are known in the art; for example, $GeO_2$ or $Al_2O_3$ are used to increase the refractive index and $B_2O_3$ or fluorine are used to reduce the refractive index. With the present method it is also possible to produce a fused silica body with approximately continuous refractive index curve by the deposition of a plurality of layers with graded doping.

Figure 2:
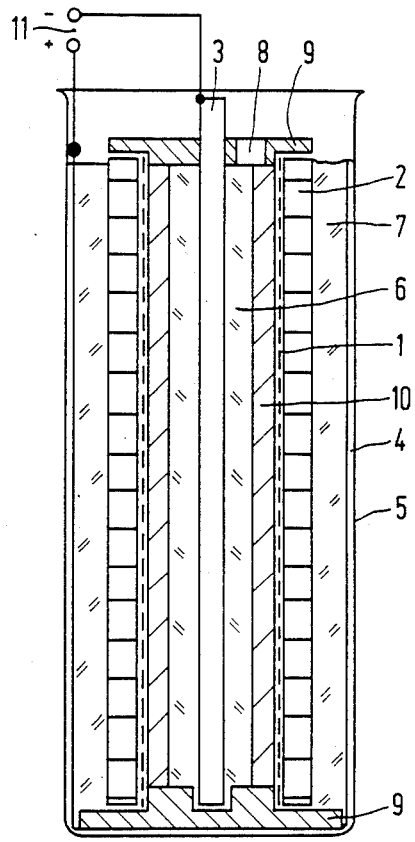
FIG. 2 is a cross-sectional view of an additional embodiment of a cell used in carrying out the method of the invention.

Equivalent parts of the electrophoresis equipment in FIGS. 1 and 2 have been given the same reference numbers. FIG. 1 shows a membrane 1, stretched unsupported between two holders 9, in the form of a porous hose, e.g. a dialysis hose; FIG. 2 shows a self-supporting membrane in the form of a porous support body 2 of hydrophilic material with a pore size of 1 to 50 um on which the porous membrane 1 is fixed on the deposition side.

The operation of the equipment illustrated in FIGS. 1 and 2 will be described jointly below for both pieces of equipment.

An anode 4 and a cathode 3 to which a voltage source is connected by means of electrode terminals 11 are mounted concentrically in a vessel 5 of, preferably, laboratory glass of fused silica. The electrodes 3, 4 are made, preferably, of noble metal (e.g. platinum) or graphite in order to prevent interfering ions of the transition metals (e.g. copper) from contaminating an aqueous suspension 6 that is to be phase-separated. A membrane 1 is mounted between the electrodes 3,4, also concentrically with the electrode system 3,4. This membrane 1 has pores which are at least smaller than the mean particle diameter of the solid particles in the aqueous suspension 6. It is advantageous to have a pore size smaller than 10 nm, which corresponds to the smallest particles present in the suspension 6, and greater than 0.14 nm, which corresponds to the ion diameter of $OH^-$ ions. The use of membrane 1 is based on the following recognition: because only the highly disperse solid particles of suspension 6 are retained by it, the deposition of the two negative charge carriers present in the suspension, namely $OH$-ions and $SiO_2$-particles, is separated in space. Because of the separation by membrane 1, oxygen arising at the anode 4 can no longer pass into the solid layer 10 deposited on the membrane and thus can no longer impair the homogeneous structure of the solid layer 10. In this way it is possible to obtain bubble-free solid precipitations from aqueous $SiO_2$ suspensions. In the interior space, formed by the stretched membrane 1, between the cathode 3 and the membrane 1 the aqueous suspension 6 is filled via a filling hole 8 with a composition as specified below. A clamping device for stretching the cantilever-mounted membrane of FIG. 1 is not illustrated separately in the drawing. Into the outer space between the membrane 1 and the anode 4 is poured an electrically conducting liquid 7, preferably high-purity water with an electrolyte addition in the form of an ionogenic substance, such as is also used for the preparation of the suspension, and in the composition and concentration range as in the suspension, preferably with the same composition and concentration as in the suspension. For the electrophoretic deposition of the solid layer 10, a direct voltage source or a direct current source is applied to the electrodes 3,4 through electrode terminals 11. Because deposition only takes place when voltage is applied, it is an easy matter, by replacing one suspension by another, to successively precipitate layers with different dopes which after sintering result in a glass with a refractive index gradient.

During the deposition the current density is between 0.1 and 100 mA/cm$^2$. This gives deposition rates of 3 to 300 mg/cm$^2$/min; for a 1-meter long tube with a diameter of 30 mm this represents a deposition quantity from 2 to 200 g/min.

After the deposition process is completed, the deposited solid layer 10 is separated from the membrane 1 or from the supporting body 2 with the membrane 1, dried and, as described below, sintered into a glass body.

The suspension used for the electrophoretic phase separation was prepared as follows: 200 g of a highly disperse fused silica powder with a particle diameter of 15 to 100 nm with a mean particle size of 40 nm are mixed with 280 ml high-purity water and 20 ml of a 5% aqueous NH$_4$F solution and homogenized for 10 min in an ultrasonic bath with a frequency of f=35 kHz.

In accordance with a first example, the suspension thus prepared is poured into a lightly tensioned dialysis hose as membrane 1 of regenerated cellulose with a pore size of 5 nm and a diameter of 21 mm in which a platinum rod of 2 mm diameter is concentrically positioned as the cathode. The space between the membrane 1 and the anode 4 which in this example is a platinum sheet bent to form a tube with an inside diameter of 34 mm contains a solution of high-purity water with an addition of 0.3 wt.% NH$_4$F. Deposition is carried out for 10 min with a constant current density of 16 mA/cm$^2$. The applied voltage rises in this case by a factor of 2. The deposition rate is 0.09 g/cm$^2$/min and the layer thickness of the solid deposited layer 10 is 3 mm.

Then the depleted suspension is poured from the membrane with the deposited solid layer 10 and the membrane 1 is separated from the deposited solid layer 10. If a membrane in the form of a dialysis hose is used, this can be removed spirally in narrow strips without damaging the glossy surface of the deposited solid layer 10.

After slow drying for a period of 24 hours, the dried green body with a density equal to 52% of the density of compact fused silica is heated to 900° C. within 3 hours and purified for a period of 4 hours in a flowing oxygen atmosphere with 6 vol.% chlorine addition. The final sintering to form a bubble- and ream-free transparent fused silica body takes place at 1500° C. in a helium atmosphere with 2 vol.% chlorine gas addition, the green body being sintered moving at 3 mm/min through the furnace.

A fused silica tube with a glossy, grain-free surface was obtained. The glass obtained in this way had a density of 2.20 g/cm$^3$, a refractive index of $n_D=1.4579$ and water and transition metal contaminations of 10 ppb. The outside diameter of the high-purity fused silica tube produced in this way was 17 mm.

Instead of the tensioned dialysis hose as membrane 1 it is also possible, as in a second example, to use a membrane 1 arranged on a porous supporting body 2 in the form of a filter tube. For this purpose, a two-part hydrophilic polyethylene tube with a pore size of 10 um, an outside diameter of 32 mm and an inside diameter of 24 mm is used which is coated on the inside with a continuous nitrocellulose layer as the membrane 1 with a pore size of 10 nm. A green body is deposited in the same way as described in relation to example 1 and, after opening of the two-part mould, is dried, purified and sintered. To facilitate removal of the mould, particularly from non-cylindrically symmetric hollow bodies, the porous body may consist of several, separable parts. The membrane 1 on the inside of the supporting body 2 stretches seamlessly over the mould joints and is not removed until the green body deposited from the suspension 6 is taken from the mould in the form of the solid layer 10. The fused silica body produced in this way had the same properties as described for example 1.

In summary, the method in question yields the following advantages:

High-purity fused silica moulded bodies can be produced in which water and transition metal impurities are present only in the ppb-range; the glass bodies obtained have glossy and grain-free surfaces both inside and out; thanks to the self-supporting compensating mechanism during deposition it is possible to obtain a uniform wall thickness of the green bodies deposited; relatively high deposition rates are obtained; very simple equipment can be employed; the use of aqueous suspensions is possible without pores caused by oxygen development occurring in the deposited green body; there is a relatively large margin in terms of the pore size of the membrane without the deposition rate being affected to any appreciable extent.

Glasses which are suitable for optical waveguides can also be used to advantage for the manufacture of envelopes for halogen and gas discharge lamps, because these glasses, like the glasses for optical waveguides, must be almost water-free and have a high silica content.

What is claimed is:

1. A method for the manufacture of a porous green body, adapted upon purification and sinterification of being formed into a glass body, said method comprising, introducing into an electrophoretic cell provided with an anode, a cathode and a porous membrane separating, said anode and cathode, an aqueous suspension having a highly dispensed content of silicon dioxide particles and applying a voltage between said cathode and anode to thereby cause said silicon dioxide particles to separate from said suspension and deposit on said membrane.

2. The method of claim 1 wherein the diameters of the pores of the membrane are smaller then the mean particle diameter of the silicon dioxide particles present in the suspension and an electrically conductive liquid separates said membrane from said anode.

3. A method as claimed in claim 2, wherein the electrically conducting liquid is water with an added electrolyte.

4. The method as claimed in claim 3, wherein the added electrolyte is an ionogenic substance which shifts the pH-value of the electrically conducting liquid towards the basic region (pH 10).

5. The method as claimed in claim 4, wherein an ammonium compound is added as the ionogenic substance.

6. The method as claimed in claim 5, wherein a 5% aqueous NH$_4$F-solution is added as the ionogenic substance.

7. The method as claimed in claim 1, wherein the silicon dioxide content of the suspension is deposited at a current density of 0.1 to 100 mA/cm$^2$ electrode surface.

8. The method as claimed in claim 7, wherein the silicon dioxide content of the suspension is deposited at a current density of 16 mA/cm$^2$ electrode surface.

9. The method as claimed in claim 2, wherein the porous membrane has pores with a diameter of 10 nm and 0.14 nm.

10. The method as claimed in claim 9, wherein the membrane is the form of a porous hose of synthetic material.

11. The method as claimed in claim 3, wherein the anode is of non-metallic material with good electrical conductivity.

12. The method as claimed in claim 11, wherein the anode is made of graphite.

13. The method as claimed in claim 1, wherein the anode is made of a noble metal.

14. The method as claimed in claim 13, wherein the anode made of platinum.

15. The method as claimed in claim 1, wherein the starting material for the glass body is an aqueous suspension which contains SiO$_2$ particles with a diameter in the range from 15 to 100 nm, having a mean particle diameter of 40 nm.

16. The method as claimed in claim 15, wherein the suspension has a solids:water weight ratio of 1:1 to 1:4 is used.

17. The method as claimed in claim 15, wherein an ionogenic substance which shifts the pH-value of the suspension towards the basic region is added to the suspension.

18. The method as claimed in claim 17, wherein the ionogenic substance added is an ammonium compound.

19. The method as claimed in claim 18, wherein a 5% aqueous NH$_4$F-solution is used as the ionogenic additive.

20. The method as claimed in claim 17, wherein the ionogenic substance is added in a quantity of 0.05 to 5 wt.% of the solids content in the suspension.

21. The method as claimed in claim 17, wherein the electrolyte is added to the electrically conducting liquid in a concentration corresponding to the concentration of the ionogenic additive in the suspension.

22. The method as claimed in claim 1, wherein several layers in succession from differently doped suspensions are deposited on the membrane thereby producing a laminated body.

23. The method as claimed in claim 22, wherein the suspensions contain dopes which bring about different refractive indices of the glass body being produced.

* * * * *